(12) United States Patent
Dolan et al.

(10) Patent No.: US 8,788,960 B2
(45) Date of Patent: Jul. 22, 2014

(54) EXCEPTION ENGINE FOR CAPACITY PLANNING

(75) Inventors: Cynthia Dolan, Hercules, CA (US); Thomas E. Hackemer, Cumming, GA (US); Fred Kaelber, San Diego, CA (US); Jermaine H. Trott, Atlanta, GA (US); Samuel F. White, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 724 days.

(21) Appl. No.: 12/609,583

(22) Filed: Oct. 30, 2009

(65) Prior Publication Data

US 2011/0107249 A1  May 5, 2011

(51) Int. Cl.
*G06F 3/048* (2013.01)

(52) U.S. Cl.
USPC .......................................... 715/772; 715/771

(58) Field of Classification Search
USPC .................. 715/771, 772; 712/244, E9.045
See application file for complete search history.

(56) References Cited

U.S. PATENT DOCUMENTS

| | | | | |
|---|---|---|---|---|
| 6,182,022 B1 * | 1/2001 | Mayle et al. | ................ | 702/182 |
| 6,356,286 B1 * | 3/2002 | Lawrence | ................ | 715/853 |
| 6,477,665 B1 * | 11/2002 | Bowman-Amuah | ................ | 714/39 |
| 6,901,442 B1 * | 5/2005 | Schwaller et al. | ................ | 709/224 |
| 7,403,886 B2 * | 7/2008 | Odhner et al. | ................ | 703/21 |
| 7,702,779 B1 * | 4/2010 | Gupta et al. | ................ | 709/224 |
| 2003/0018696 A1 * | 1/2003 | Sanchez et al. | ................ | 709/201 |
| 2005/0097517 A1 * | 5/2005 | Goin et al. | ................ | 717/124 |
| 2005/0171692 A1 * | 8/2005 | Hamblen et al. | ................ | 701/209 |
| 2005/0209876 A1 * | 9/2005 | Kennis et al. | ................ | 705/1 |
| 2006/0212487 A1 * | 9/2006 | Kennis et al. | ................ | 707/200 |
| 2007/0100793 A1 * | 5/2007 | Brown et al. | ................ | 707/2 |
| 2007/0150480 A1 * | 6/2007 | Hwang et al. | ................ | 707/10 |
| 2007/0168874 A1 * | 7/2007 | Kloeffer et al. | ................ | 715/764 |
| 2008/0209564 A1 * | 8/2008 | Gayde et al. | ................ | 726/25 |
| 2009/0158189 A1 * | 6/2009 | Itani | ................ | 715/772 |

OTHER PUBLICATIONS

Hammergren; Thomas C., et al., Data Warehousing for Dummies, 2nd ed., Wiley Publishing, Inc. ISBN: 978-0-470-40747-9. Copyright 2009. pp. 12-13.*

Inmon, William H., Building the Data Warehouse, 4th ed., Wiley Publishing, Inc. ISBN-10: 0-7645-9944-5. Copyright 2005. p. 495.*

* cited by examiner

*Primary Examiner* — Steven Sax
*Assistant Examiner* — Wilson Varga
(74) *Attorney, Agent, or Firm* — Hartman & Citrin LLC (57) ABSTRACT

An exception engine having a data layer, an application layer, and a presentation layer is provided. The data layer may be configured to store values of a plurality of metrics collected when operating a plurality of computers. The application layer may be configured to trigger exceptions based on the plurality of metrics. The presentation layer configured to provide an interface for customizing the exceptions.

15 Claims, 6 Drawing Sheets

| | DATE 402 | SYSTEM 404 | CHANGE MADE BY 406 | METRIC CHANGED 408 | CURRENT SETTING 410 | PREVIOUS SETTING 412 |
|---|---|---|---|---|---|---|
| 422 → | 1/1/09 | FIRST SYSTEM | ALICE | PROCESS UTILIZATION | THRESHOLD: 70 TIME: 1 | THRESHOLD: 60 TIME: 1 |
| 424 → | 1/1/09 | FIRST SYSTEM | ALICE | MEMORY UTILIZATION | THRESHOLD: 50 TIME: 2 | THRESHOLD: 50 TIME: 1 |
| 426 → | 1/1/09 | FIRST SYSTEM | ALICE | STORAGE UTILIZATION | THRESHOLD: 30 TIME: 3 | THRESHOLD: 40 TIME: 2 |
| | ⋮ | ⋮ | ⋮ | ⋮ | ⋮ | ⋮ |
| 428 → | 1/1/09 | NTH SYSTEM | BOB | NETWORK UTILIZATION | THRESHOLD: 10 TIME: 1 | THRESHOLD: 20 TIME: 2 |

| DATE 402 | SYSTEM 404 | CHANGE MADE BY 406 | METRIC CHANGED 408 | CURRENT SETTING 410 | PREVIOUS SETTING 412 |
|---|---|---|---|---|---|
| 1/1/09 | FIRST SYSTEM | ALICE | PROCESS UTILIZATION | THRESHOLD: 70 TIME: 1 | THRESHOLD: 60 TIME: 1 |
| 1/1/09 | FIRST SYSTEM | ALICE | MEMORY UTILIZATION | THRESHOLD: 50 TIME: 2 | THRESHOLD: 50 TIME: 1 |
| 1/1/09 | FIRST SYSTEM | ALICE | STORAGE UTILIZATION | THRESHOLD: 30 TIME: 3 | THRESHOLD: 40 TIME: 1 |
| ... | ... | ... | ... | ... | THRESHOLD: 20 TIME: 2 |
| 1/1/09 | NTH SYSTEM | BOB | NETWORK UTILIZATION | THRESHOLD: 10 TIME: 1 | THRESHOLD: 20 TIME: 2 |

EXCEPTION ENGINE FOR CAPACITY PLANNING

BACKGROUND

This application relates generally to the field of capacity planning. More specifically, the disclosure provided herein relates to providing a tool for aiding capacity planners.

Capacity planning generally refers to a predictive process for determining the amount of future computing hardware resources required to support estimated changes in workload. Some changes may increase the workload of the computing hardware resources such that a current system is over-utilized. Other changes may decrease the workload of the computing hardware resources such that a current system is under-utilized. A capacity planner may refer to a person who performs the capacity planning function and makes decisions related to whether changes to existing computing hardware resources are needed.

Conventional capacity planning is typically performed by manually monitoring a group of computer systems. Such an approach may be suitable when an adequate number of capacity planners are available and when the quantity of systems to be monitored is sufficiently small. However, when the number of available capacity planners is low and when the quantity of computer systems to be monitored greatly exceeds the number of available capacity planners, manually monitoring the computer systems may become impractical and inefficient.

SUMMARY

Embodiments of the disclosure presented herein include methods, systems, and computer-readable media for providing an exception engine for capacity planning. According to one aspect, a method for providing an exception engine for capacity planning is provided. According to the method, an exception engine having a data layer, an application layer, and a presentation layer is provided. The data layer may be configured to store values of a plurality of metrics collected when operating a plurality of computers. The application layer may be configured to trigger exceptions based on the plurality of metrics. The presentation layer may be configured to provide an interface for customizing the exceptions.

According to another aspect, a system for providing an exception engine for capacity planning is provided. The system includes a memory and a processor functionally coupled to the memory. The memory stores a program containing code for providing the exception engine. The processor is responsive to computer-executable instructions contained in the program and configured to perform the following operations. An exception engine having a data layer, an application layer, and a presentation layer is provided. The data layer may be configured to store values of a plurality of metrics collected when operating a plurality of computers. The application layer may be configured to trigger exceptions based on the plurality of metrics. The presentation layer may be configured to provide an interface for customizing the exceptions.

According to yet another aspect, a computer-readable medium having instructions stored thereon for execution by a processor to perform a method for providing an exception engine for capacity planning is provided. According to the method, an exception engine having a data layer, an application layer, and a presentation layer is provided. The data layer may be configured to store values of a plurality of metrics collected when operating a plurality of computers. The application layer may be configured to trigger exceptions based on the plurality of metrics. The presentation layer may be configured to provide an interface for customizing the exceptions.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing an exception engine for capacity planner. The exception engine may provide a variety of automated exceptions through which a capacity planner can be notified of a potential capacity planning issue. Potential capacity planning issues may include, but are not limited to, system over-utilization, system under-utilization, and hardware changes. The exception engine may enable the capacity to customize and configure the exceptions as necessary. Further, the exception engine may be auditable.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
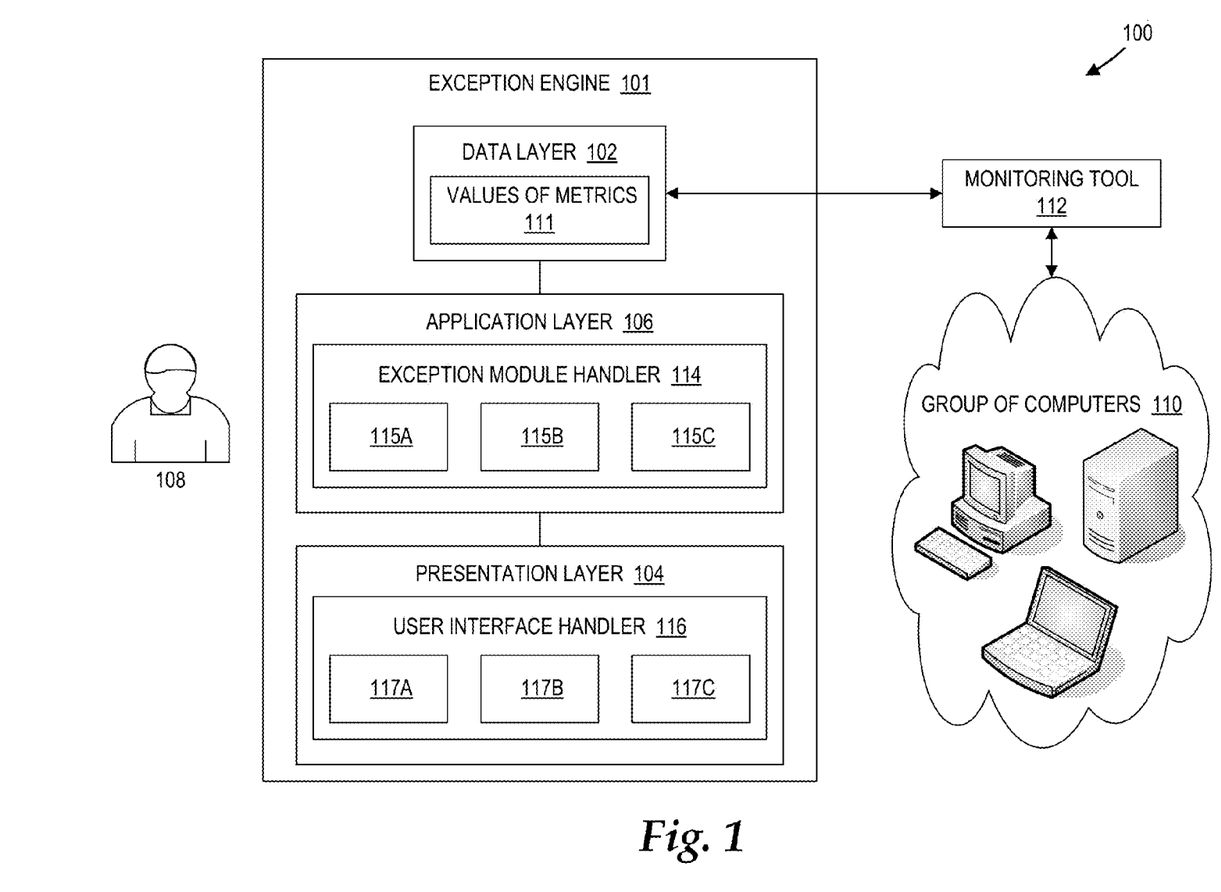
FIG. 1 is a flow diagram illustrating an exemplary network environment configured to provide capacity planning functionality, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, FIG. 1 is a block diagram illustrating an exemplary network environment 100 configured to provide capacity planning functionality, in accordance with some embodiments. The network environment 100 may include an exception engine 101. The exception engine 101 may include a data layer 102, a presentation layer 104, and an application layer 106 coupling the data layer 102 and the presentation layer 104. The exception engine 101 may enable a capacity planner 108 to monitor a group of one or more computers 110. The group of computers 110 may include personal computers, servers, and other suitable computing devices. The exception engine 101 may be embodied in hardware, software, firmware, or combinations thereof.

The data layer 102 may include a suitable database configured to store collected values of one or more metrics 111 regarding the operations of the group of computers 110. According to embodiments, the metrics may include various data regarding the utilization of hardware resources in the group of computers 110. Examples of metrics may include, but are not limited to, processor utilization, memory utilization, storage utilization, and network utilization. The value of a given metric may specify the utilization of at least one of the group of computers 110. The value of a given metric 111 may also be associated with a time component indicating a time or time frame in which the value of the metric was collected (e.g., processor utilization over a two hour period, memory utilization on Sunday between 3 am and 4 am, etc.).

The values of the metrics 111 may be collected by a monitoring tool 112 that is coupled to the group of computers 110. The monitoring tool 112 may include system utilities, such as the "sar" command in UNIX which displays processor activity. The monitoring tool 112 may also include commercial monitoring products, such as PERFORM from BMC SOFTWARE, INC. and MEASUREWARE from HEWLETT-PACKARD COMPANY. When the monitoring tool 112 collects the values of the metrics 111, the monitoring tool 112 may store the values of the metrics 111 in the data layer 102. In some embodiments, the data layer 102 may be a data warehouse. In other embodiments, the data layer 102 may be any suitable repository configured to store the values of the metrics 111 collected by the monitoring tool 112 and to retrieve the values of the metrics 111 when requested by the application layer 106.

The application layer 106 may include an exception module handler 114. The exception module handler 114 may include one or more exception modules 115A, 115B, 115C (collectively referred to as exception modules 115). The exception modules 115 may specify exceptions based on the values of the metrics 111 stored in the data layer 102. As used herein, an exception (also known as an engineering level) refers to a change in the values of the metrics 111 that triggers an alert to the capacity planner 108. In some embodiments, the exception module handler 114 includes the threshold exception module 115A, which facilitates the triggering of threshold exceptions. A threshold exception may be triggered when one of the values of the metrics 111 goes above or falls below a threshold. The thresholds may indicate over-utilization or under-utilization of the group of computers 110. The threshold may also be associated with a time component. For example, the threshold exception module 115A may specify that the threshold exception is triggered when processor utilization rises above 90% for two consecutive hours.

In some other embodiments, the exception module handler 114 may include the relative exception module 115B that facilitates the triggering of relative exceptions. A relative exception may be triggered when one of the values of the metrics 111 experiences a significant change, which may potentially indicate unusual behavior. For example, processor utilization may be around 30% for the last three months, and the threshold may be 90%. If the processor utilization suddenly jumps to 70%, then the relative exception may be triggered. The relative exception may be triggered even though the threshold exception is not triggered because the processor utilization is under 90%.

In yet other embodiments, the exception module handler 114 may include the hardware change exception module 115C that facilitates the triggering of hardware change exceptions. A hardware change exception may be triggered when a computer system in the group of computers 110 experiences a change in hardware resources. For example, hardware resources may be added, replaced, and/or removed from the group of computers 110.

It should be appreciated that the threshold exception module 115A, the relative exception module 115B, and the hardware change exception module 115C are merely examples. Other exception modules that facilitate the triggering of other suitable exceptions may be utilized. In particular, the exception modules 115 in the exception module handler 114 are modular. For example, the capacity planner 108 may customize the exception module handler 114 by adding (or enabling) exception modules and by removing (or disabling) exception modules.

The presentation layer 104 may include a user interface handler 116. The user interface handler 116 may include one or more user interfaces 117A, 117B, 117C (collectively referred to as user interfaces 117) enabling the capacity planner 108 to interact with the application layer 106. In some embodiments, the user interface handler 116 includes the exception setting interface 117A. Through the exception setting interface 117A, the capacity planner 108 can customize the thresholds utilized by the threshold exception module 115A. In particular, the exception setting interface 117A may enable the capacity planner 108 to set values of the thresholds and the time component associated with the thresholds. The exception setting interface 117A may also enable the capacity planner 108 to choose which exceptions to enable and disable for particular computer systems in the group of computers 110.

The exception setting interface 117A may also provide tracking functionality, which enables the exception engine 101 to be auditable. In particular, the tracking functionality may record the name of the capacity planner 108 when the capacity planner 108 makes changes to the thresholds. The exception setting interface 117A may also record the date that the changes were made and the type of changes that were made (e.g., change to a threshold, change to a time component, etc.). An exemplary implementation of the exception setting interface 117A is described in greater detail below with reference to FIG. 2.

In some other embodiments, the user interface handler 116 includes the exception display interface 117B. The exception display interface 117B may display the number of exceptions that were triggered for a given time period. The given time period may be seven days, six weeks, six months, or other suitable time frame. The exception display interface 117B may be organized by application, computer system, and/or exception type. The exception display interface 117B may also provide details about the exceptions, such as the metrics that triggered the exceptions and the values of the metrics that triggered the exceptions.

The exception display interface 117B may also provide acknowledgment functionality, which enables the exception engine 101 to be auditable. In particular, when the capacity planner 108 examines an exception in the exception display interface 117B, the exception display interface 117B may note that the capacity planner 108 has viewed the exception. The acknowledgment may also enable the capacity planner 108 to enter comments regarding the exception and/or to view comments made by other capacity planners about the exception. An exemplary implementation of the exception display interface 117B is described in greater detail below with reference to FIG. 3.

In yet other embodiments, the user interface handler 116 includes the report interface 117C. The report interface 117C may display a list of changes to thresholds made by capacity planners, such as the capacity planner 108. For example, the report interface 117C may display the names of capacity planners who have made changes to thresholds and the type of changes that were made. The reports may also provide auditability with regards to the triggered exceptions. For example, the reports may detail exceptions that occurred, when the exceptions occurred, and whether a capacity planner has acknowledged that the exceptions have occurred. The report interface 117C may generate reports that can be provided to an auditor when the capacity planner 108 or the capacity planning department employing the capacity planner 108 is audited. An exemplary implementation of the report interface 117C is described in greater detail below with reference to FIG. 4.

It should be appreciated that the exception setting interface 117A, the exception display interface 117B, and the report interface 117C are merely examples. Other suitable interfaces for accessing and displaying data retrieved and/or generated by the application layer 106 may be utilized.

Figure 2:
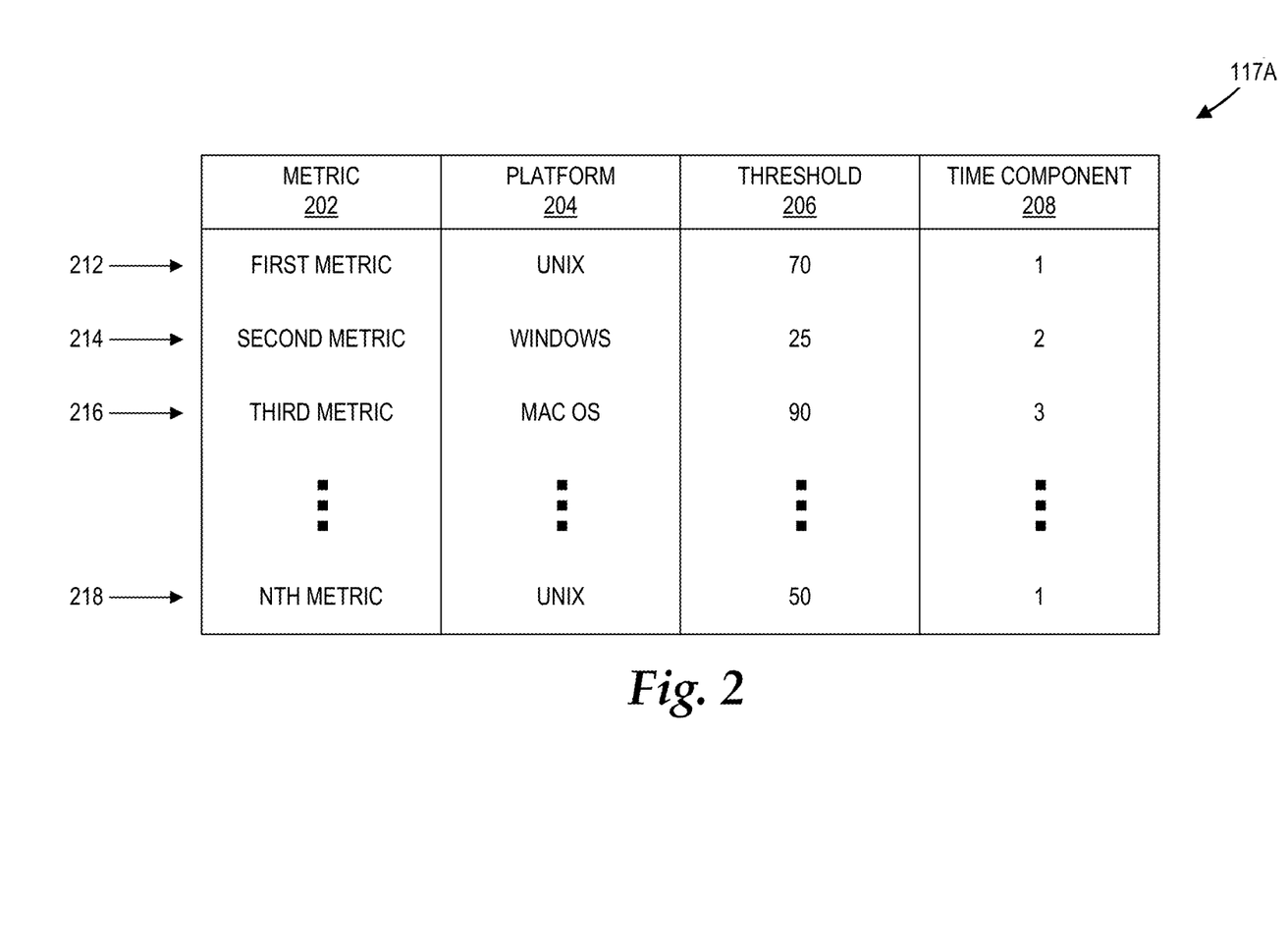
FIG. 2 is a screen display diagram illustrating an exemplary implementation of the exception setting interface, in accordance with some embodiments.

FIG. 2 is a screen display diagram illustrating an exemplary implementation of the exception setting interface 117A, in accordance with some embodiments. As illustrated in FIG. 2, the exception setting interface 117A includes metric column 202, a platform column 204, a threshold column 206, and a time component column 208. The exception setting interface 117A further includes a first row 212, a second row 214, a third row 216, and an Nth row 218. The exception setting interface 117A includes a plurality of entries, each of which corresponds to one of the columns 202, 204, 206, 208 and one of the rows 212, 214, 216, 218.

The metric column 202 may specify various metrics that can be collected by the monitoring tool 112. In the metric column 202, the first row 212 corresponds to a first metric, the second row 214 corresponds to a second metric, the third row 216 corresponds to a third metric, and the Nth row 218 corresponds to an Nth metric. The platform column 204 may specify various platforms upon which the metrics are collected. In the platform column 204, the first row 212 corresponds to UNIX, the second row 214 corresponds to WINDOWS from MICROSOFT CORPORATION, the third row 216 corresponds to MAC OS from APPLE, INC., and the Nth row 218 corresponds to UNIX.

The threshold column 206 may specify thresholds corresponding to each of the metrics. The thresholds may be maximum thresholds and/or minimum thresholds. With maximum thresholds, when a metric rises above the corresponding maximum threshold, an exception is triggered. With minimum thresholds, when a metric falls below the corresponding minimum threshold, an exception is triggered. The thresholds may specify percentage values, raw data values, or other suitable threshold values. According to embodiments, the capacity planner 108 may access the threshold column 206 and change the values of the thresholds using a suitable input device, such as a mouse and/or a keyboard.

The time component column 208 may specify time frames for which the corresponding metric needs to rise above or fall below the corresponding threshold in order to trigger an exception. According to embodiments, the capacity planner 108 may access the time component column 208 and change the values of the time frames using a suitable input device. The time frame column 208 may specify hours, minutes, or other suitable time units. In one example, in the first row 212, the threshold column 206 specifies a value of seventy, and the time component column 208 specifies a value of one. Thus, the first row 212 may specify that if the first metric exceeds 70% utilization for more than one hour, then an exception is triggered. In another example, in the second row 214, the threshold column 206 specifies a value of twenty-five, and the time component column 208 specifies a value of two. Thus, the second row 212 may specify that if the second metric falls below 25% capacity for more than two hours, then an exception is triggered.

Figure 3:
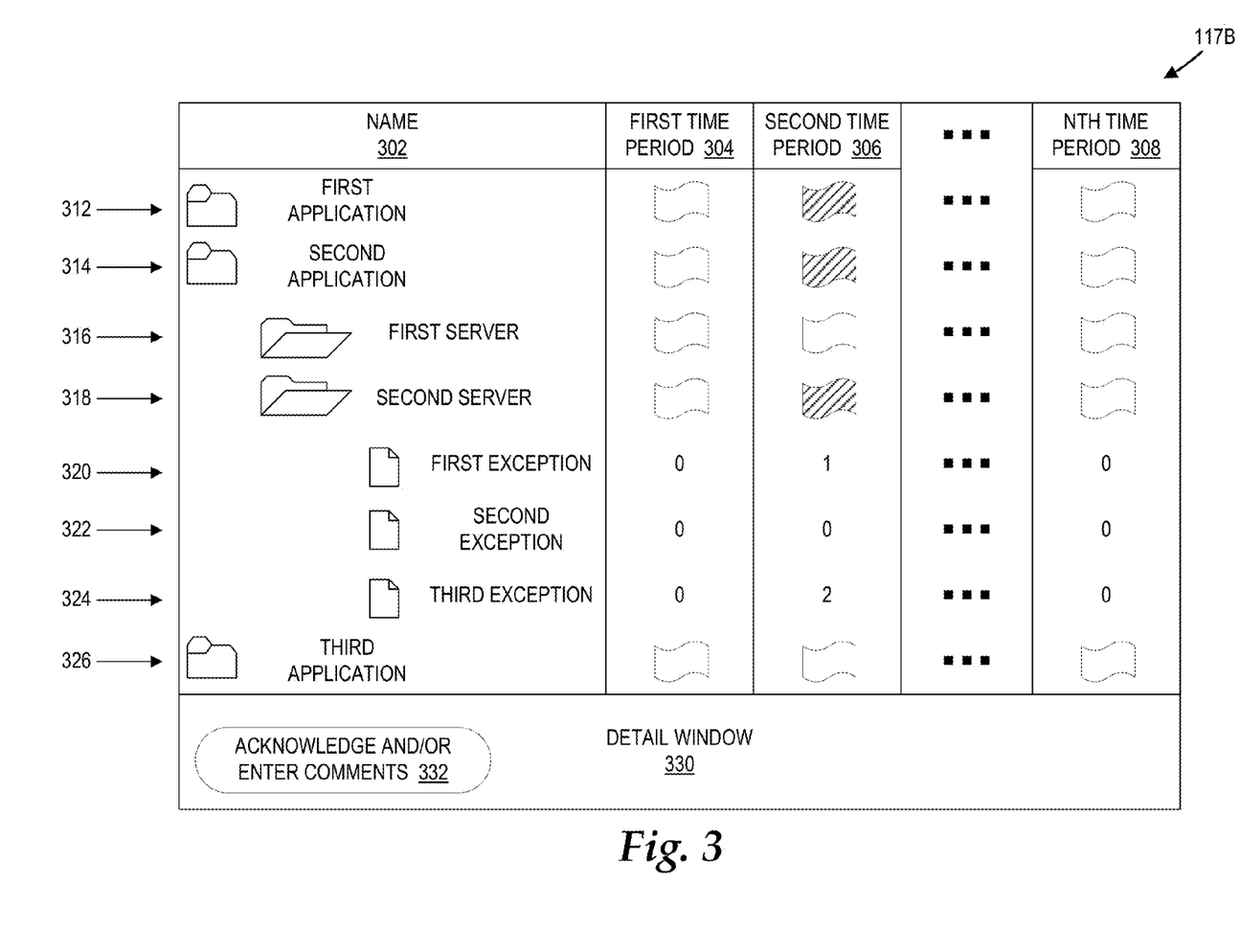
FIG. 3 is a screen display diagram illustrating an exemplary implementation of the exception display interface, in accordance with some embodiments.

FIG. 3 is a screen display diagram illustrating an exemplary implementation of the exception display interface 117B, in accordance with some embodiments. As illustrated in FIG. 3, the exception display interface 117B includes a name column 302, a first time period column 304, a second time period column 306, and an Nth time period column 308. The exception display interface 117B further includes a first row 312, a second row 314, a third row 316, a fourth row 318, a fifth row 320, a sixth row 322, a seventh row 324, and an eighth row 326. The exception display interface 117B includes a plurality of entries, each of which corresponds to one of the columns 302, 304, 306, 308 and one of the rows 312, 314, 316, 318, 320, 322, 324, 326.

The name column 302 may specify the name of a particular application, a particular server, or a particular exception. For example, in the name column 302, the first row 312, the second row 314, and the eighth row 326 specify applications, the third row 316 and the fourth row 318 specify servers, and the fifth row 320, the sixth row 322, and the seventh row 324 specify exceptions. According to embodiments, the name column 302 is arranged as a hierarchical structure including three levels. The first level includes applications, the second level includes servers, and the third level includes exceptions. In this case, the capacity planner 108 may select an application at the first level in order to view the servers that execute the application at the second level. Further, the capacity planner 108 may select a server at the second level in order to view exceptions that were triggered on the server at the third level.

For example, the second row 314 corresponds to the second application. Initially, the third row 316, the fourth row 318, the fifth row 320, the sixth row 322, and the seventh row 324 may be hidden from view on the exception display interface 117B. When the capacity planner 108 selects the second application on the second row 314, the exception display interface 117B may display the third row 316 and the fourth row 318. The third row 316 and the fourth row 318 display the first server and the second server, both of which execute the second application. When the capacity planner 108 selects the second server on the fourth row 318, the exception display interface 117B may display the fifth row 320, the sixth row 322, and the seventh row 324. The fifth row 320, the sixth row 322, and the seventh row 324 display the first exception, the second exception, and the third exception, each of which are exceptions that triggered at the second server.

The first time period column 304 may specify values of the corresponding application, server, or exception during a first time period. The second time period column 306 may specify values of the corresponding application, server, or exception during a second time period. The Nth time period column 308 may specify values of the corresponding application, server, or exception during an Nth time period. With regards to applications and servers, the value under the time period columns 304, 306, 308 may be a binary value represented by a flag graphic. As illustrated in FIG. 3, an unshaded flag may represent that no exceptions occurred for the corresponding application or server during the corresponding time period, whereas a shaded flag may represent that at least one exception occurred for the corresponding application or server during the corresponding time period. With regards to exceptions, the value under the time period columns 304, 306, 308 may be a numeric value indicating the number of the times that the corresponding exception was triggered during the corresponding time period.

For example, according to the second row 314, no exceptions were triggered when the second application was executed during the first time period, and at least one exception was triggered when the second application was executed during the second time period. As previously described, the capacity planner 108 may access and view the third row 316 and the fourth row 318 by selecting the second application on the second row 314. According to the third row 316, no exceptions were triggered when the first server executed the second application during the first time period and the second time period. According to the fourth row 318, no exceptions were triggered when the second server executed the second application during the first time period, whereas at least one exception was triggered when the second server executed the second application during the second time period.

As previously described, the capacity planner 108 may access and view the fifth row 320, the sixth row 322, and the seventh row 324 by selecting the second server on the fourth row 318. According to the fifth row 320, no instances of the first exception were triggered during the first time period, whereas one instance of the first exception was triggered during the second time period. According to the sixth row 322, no instances of the second exception were triggered during the first time period and the second time period. According to the seventh row 324, no instances of the third exception were triggered during the first time period, whereas two instances of the third exception were triggered during the second time period.

When the capacity planner 108 reaches the fifth row 320, the sixth row 322, and the seventh row 324, the capacity planner 108 may select one of the rows 320, 322, 324 to view additional details about the corresponding exception through the detail window 330. The detail window 330 may display any suitable information about the exception. For example, the detail window 330 may display information about the metric that triggered the exception, including the value of the metric for a given time frame and the threshold of the metric. The detail window 330 may also include an acknowledgment button 332. The capacity planner 108 may select the acknowledgment button 332 to acknowledge that the capacity planner 108 has investigated the corresponding exception and/or to enter any comments about the corresponding exception. In further embodiments, the detail window 330 may also display previous acknowledgments made about the corresponding exception, server configuration data, and hardware change history data.

Through the exception display interface 117B, the capacity planner 108 can easily and quickly identify when exceptions occur by viewing the flag graphic or other suitable indicator. The hierarchical arrangement of the data displayed in the exception display interface 117B further enables the capacity planner 108 to investigate additional details by "drilling down" from the application to the server and from the server to the exception. In this way, the capacity planner 108 is provided with only a subset of the data at any given time, rather than being inundated with large amounts of data that may be difficult for the capacity planner 108 to organize and comprehend.

Figure 4:
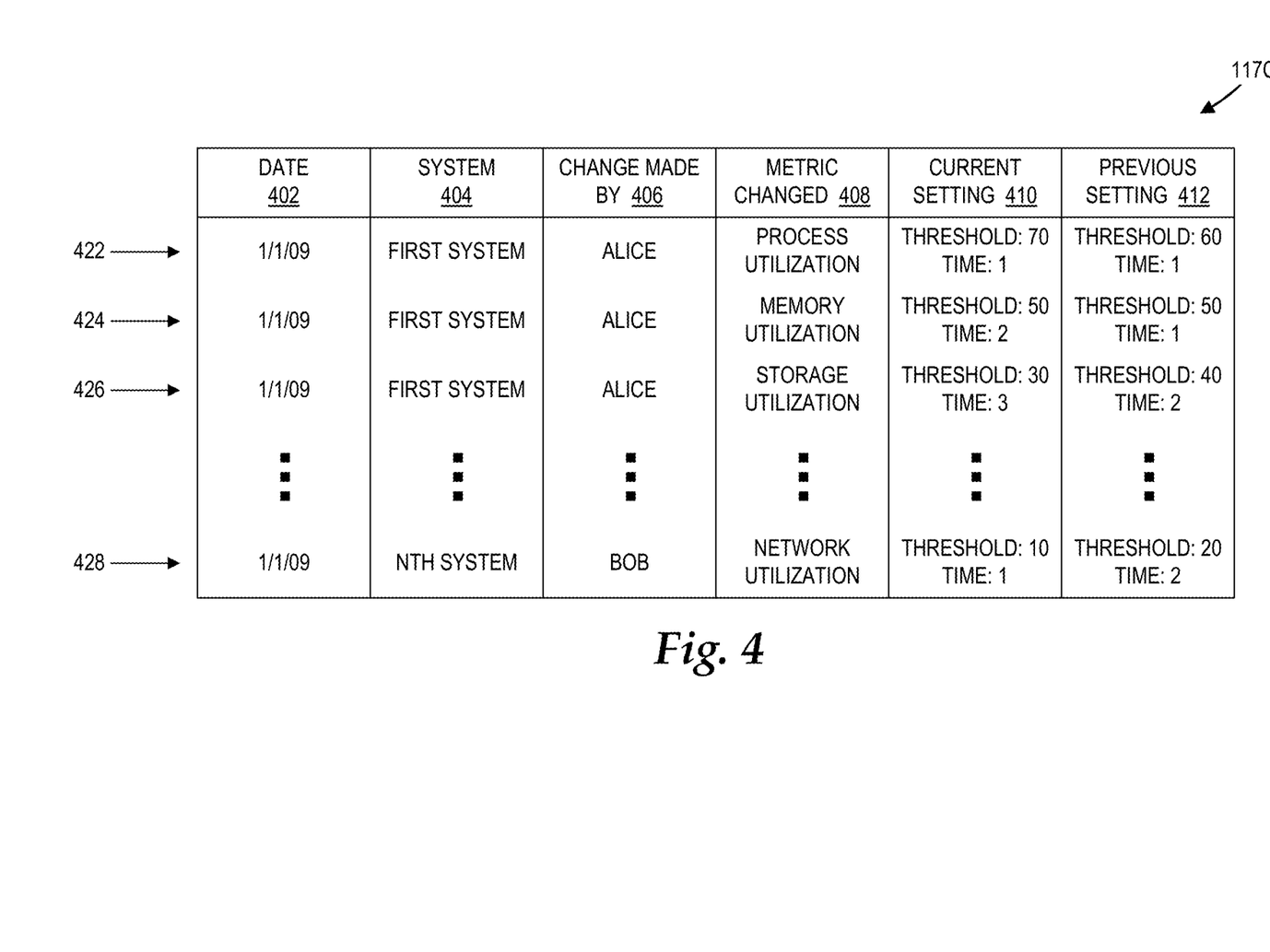
FIG. 4 is a screen display diagram illustrating an exemplary implementation of the report interface, in accordance with some embodiments.

FIG. 4 is a screen display diagram illustrating an exemplary implementation of the report interface 117C, in accordance with some embodiments. As illustrated in FIG. 4, the report interface 117C includes a date column 402, a system column 404, a capacity planner identification column 406, a metric identification column 408, a current settings column 410, and a previous settings column 412. The report interface 117C further includes a first row 422, a second row 424, a third row 426, and an Nth row 428. The exception display interface 117B includes a plurality of entries, each of which corresponds to one of the columns 402, 404, 406, 408, 410, 412 and one of the rows 422, 424, 426, 428.

The date column 402 may specify the date of a given change. The system column 404 may specify the system for which a change is made. The capacity planner identification column 406 may specify the name of the capacity planner, such as the capacity planner 108, who made the change. The metric identification column 408 may specify the metric for which a change is made. The current settings column 410 may specify the current values, such as a threshold and a time component, of the identified metric. The previous setting column 412 may specify the previous values of the identified metric.

In one example, according to the first row 422, on Jan. 1, 2009, Alice made a change to the processor utilization metric corresponding to the first system. In particular, Alice changed the corresponding threshold from a value of sixty to a value of seventy. However, the corresponding time component was not changed. In another example, according to the second row 424, on Jan. 1, 2009, Alice made a change to the memory utilization metric corresponding to the second system. In particular, Alice changed the corresponding time component from a value of one to a value of two. However, the corresponding threshold was not changed.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 5:
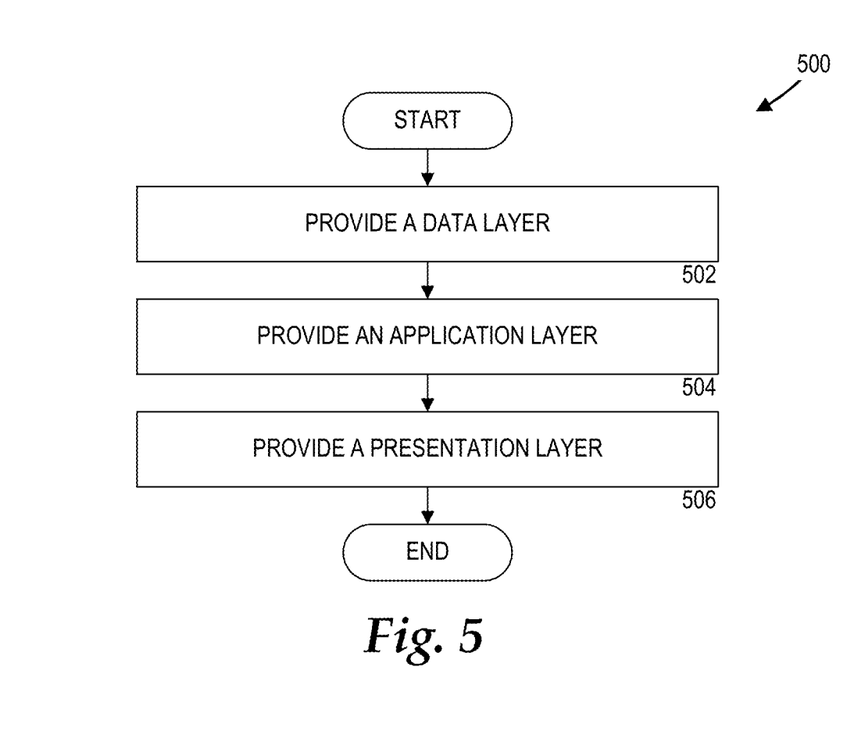
FIG. 5 is a flow diagram illustrating an exemplary method for providing an execution engine for capacity planning, in accordance with some embodiments.

Referring now to FIG. 5, additional details will be provided regarding the operations of the exception engine 101. In particular, FIG. 5 is a flow diagram illustrating an exemplary method 500 for providing the exception engine 101 for capacity planning, in accordance with some embodiments. The method 500 begins at operation 502, where the data layer 102 of the exception engine 101 is provided. The data layer 102 may be configured to store the values of the metrics 111 collected when operating the group of computers 110. In particular, the values of the metrics 111 may be collected by the monitoring tool 112 and stored in the data layer 102. The data layer 102 may be any suitable repository, such as a data warehouse, configured to store the values of the metrics 111 and to provide the values of the metrics 111 when requested by the application layer 106. Upon providing the data layer 102, the method 500 proceeds to operation 504.

At operation 504, the application layer 106 of the exception engine 101 is provided. The application layer 106 may be configured to trigger exceptions based on the values of the metrics 111. For example, exceptions may be triggered the at least one of the values of the metrics 111 exceeds or falls below a threshold. Exceptions may also be triggered when changes to hardware resources are made in at least one of the group of computers 110 and for various other changes to the group of computers 110. Upon providing the application layer 106, the method 500 proceeds to operation 506.

At operation 506, the presentation layer 104 of the exception engine 101 is provided. The presentation layer 104 may be configured to provide a variety of interfaces for interacting with the application layer 106. Examples of the interfaces may include the exception setting interface 117A, the exception display interface 117B, and the report interface 117C. Through the exception setting interface 117A, the capacity planner 108 can customize and set thresholds and time components that trigger exceptions.

Through the exception display interface 117B, the capacity planner 108 can view an organized arrangement of exceptions. The exception display interface 117B may organize the exceptions by application, by server, and/or by type of exception. The exception display interface 117B may also be configured to accept acknowledgements that the capacity planner 108 has addressed each of the exceptions and to accept comments regarding each of the exceptions. Through the report interface 117C, the capacity planner 108 can generate reports that provide full accountability of the customizations and changes made by capacity planners, such as the capacity planner 108. The reports may also provide auditability with regards to the triggered exceptions. For example, the reports may detail exceptions that occurred, when the exceptions occurred, and whether a capacity planner has acknowledged that the exceptions have occurred.

Figure 6:
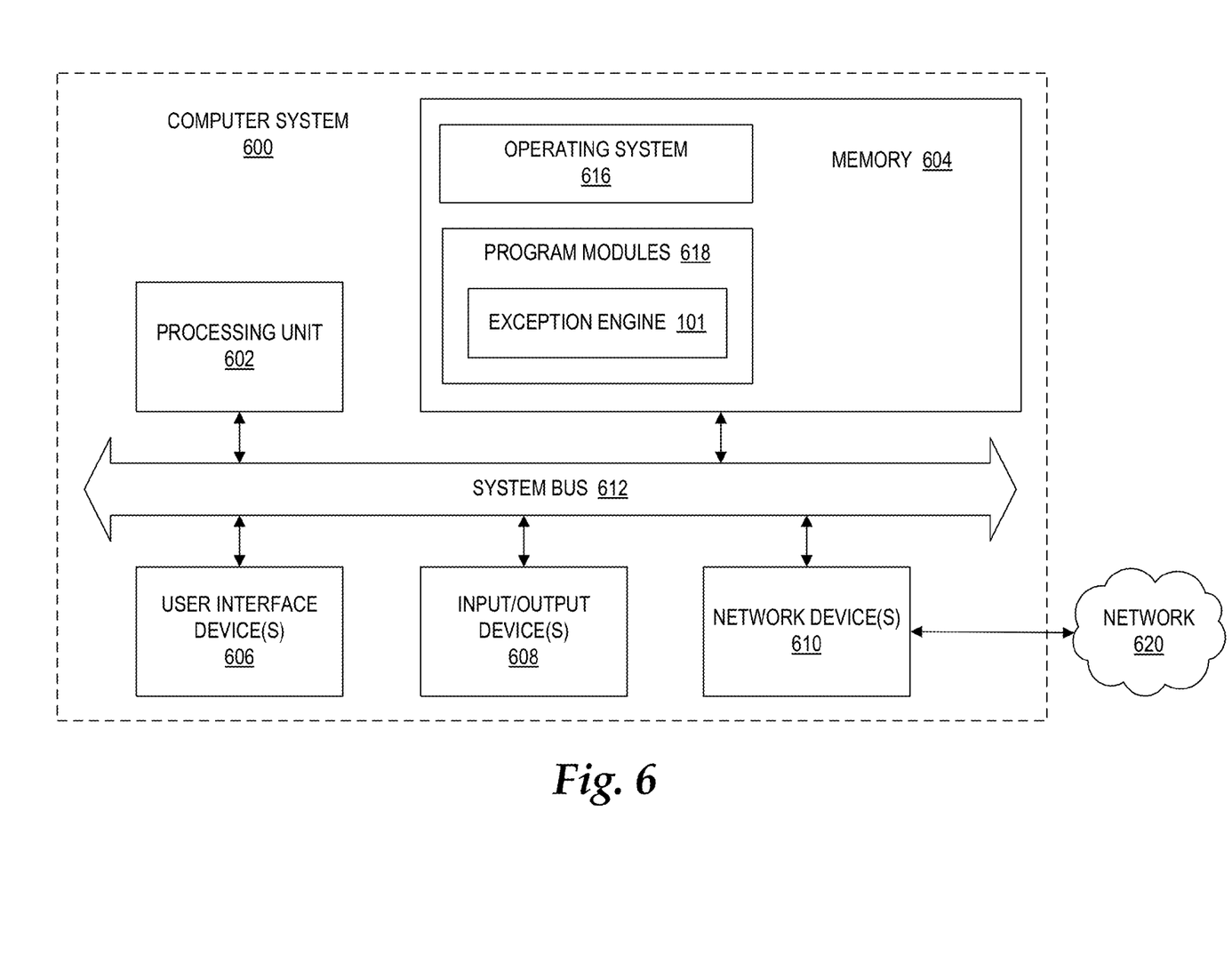
FIG. 6 is a block diagram illustrating an exemplary computer system configured to provide an exception engine for capacity planning, in accordance with some embodiments.

FIG. 6 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 6 is a block diagram illustrating a computer system 600 configured to provide the exception engine 101 for capacity planning, in accordance with embodiments. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 604 communicates with the processing unit 602 via the system bus 612. In one embodiment, the memory 604 is operatively connected to a memory controller (not shown) that enables communication with the processing unit 602 via the system bus 612. The memory 604 includes an operating system 616 and one or more program modules 618, according to exemplary embodiments. Examples of operating systems, such as the operating system 616, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 618 include at least a portion of the exception engine 101. For example, the application layer 106 and the presentation layer 104 may be embodied as one of or more of the program modules 618. According to embodiments, the program modules 618 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 618. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via the network 620. Examples of the network devices 610 may include, but are not limited to, a modem, a radio frequency ("RF") or infrared ("IR") transceiver, a telephonic interface, a bridge, a router, or a network card. The network 620 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 620 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for providing an exception engine for capacity planning in a network environment, the method comprising:
   providing a data layer, the data layer comprising a data warehouse that stores values of a plurality of metrics collected by a monitoring device while a plurality of computers are operating, the plurality of metrics comprising processor utilization, memory utilization, storage utilization, and network utilization;
   providing an application layer that accesses the plurality of metrics in the data layer, and upon accessing the plurality of metrics in the data layer, triggers exceptions comprising a first exception when a first metric in the plurality of metrics exceeds a first threshold and a second exception when a second metric in the plurality of metrics falls below a second threshold; and
   providing a presentation layer that provides:
      an exception setting interface configured to allow customization of the exceptions by at least one of a plurality of capacity planners, the exception setting interface comprising a threshold column and a time component column,
      an exception display interface that displays the exceptions and whether the exceptions have been triggered, arranged by application and type of exception, and
      a report interface that displays changes to the data layer made by at least one of the plurality of capacity planners and to associate each of the changes with a corresponding one of the plurality of capacity planners, that displays a metric identification that specifies a metric of the plurality of metrics that was changed as a result of the changes, that displays a current setting of the metric specified in the metric identification, the current setting comprising a current value of the metric after the changes, the current setting pertaining to a threshold or to a time component, and displays a previous setting of the metric specified in the metric identification, the previous setting comprising a previous value of the metric before the changes, the previous setting pertaining to a threshold or to a time component.

2. The computer-implemented method of claim 1, wherein the exception setting interface enables at least one of the plurality of capacity planners to set a first value of the first threshold and a second value of the second threshold.

3. The computer-implemented method of claim 1, wherein the application layer triggers the exceptions based on changes to hardware resources in at least one of the plurality of computers.

4. The computer-implemented method of claim 1, wherein the exception display interface further displays whether the exceptions have been triggered, arranged by computer.

5. The computer-implemented method of claim 1, wherein the exception display interface enables at least one of the plurality of capacity planners to record acknowledgments that at least one of the exceptions have been addressed by at least one of the plurality of capacity planners.

6. A system for providing an exception engine for capacity planning in a network environment, the system comprising:
   a memory for storing a program containing code for providing the exception engine; and
   a processor functionally coupled to the memory, the processor being responsive to computer-executable instructions contained in the program that, when executed by the processor, cause the processor to perform operations comprising:
      providing a data layer, the data layer comprising a data warehouse that stores values of a plurality of metrics collected by a monitoring device while a plurality of computers are operating, the plurality of metrics comprising processor utilization, memory utilization, storage utilization, and network utilization
      providing an application layer that accesses the plurality of metrics in the data layer, and upon accessing the plurality of metrics in the data layer, triggers exceptions comprising a first exception when a first metric in the plurality of metrics exceeds a first threshold and a second exception when a second metric in the plurality of metrics falls below a second threshold, and
      providing a presentation layer that provides:
         an exception setting interface configured to allow customization of the exceptions by at least one of a plurality of capacity planners, the exception setting interface comprising a threshold column and a time component column,
         an exception display interface that displays the exceptions and whether the exceptions have been triggered, arranged by application and type of exception, and
         a report interface that displays changes to the data layer made by at least one of the plurality of capacity planners and to associated each of the changes with a corresponding one of the plurality of capacity planners, that displays a metric identification that specifies a metric of the plurality of metrics that was changed as a result of the changes, that displays a current setting of the metric specified in the metric identification, the current setting comprising a current value of the metric after the changes, the current setting pertaining to a threshold or to a time component, and displays a previous setting of the metric specified in the metric identification, the previous setting comprising a previous value of the metric before the changes, the previous setting pertaining to a threshold or to a time component.

7. The system of claim 6, wherein the an exception setting interface enables at least one of the plurality of capacity planners to set a first value of the first threshold and a second value of the second threshold.

8. The system of claim 6, wherein the application layer triggers the exceptions based on changes to hardware resources in at least one of the plurality of computers.

9. The system of claim 6, wherein the exception display interface further displays whether the exceptions have been triggered, the exceptions arranged by computer.

10. The system of claim 6, wherein the exception display interface enables at least one of the plurality of capacity planners to record acknowledgments that at least one of the exceptions have been addressed by at least one of the plurality of capacity planners.

11. A non-transitory computer-readable medium having instructions stored thereon that, when executed by a processor, cause the processor to perform operations for capacity planning in a network environment comprising:

provididing a data layer, the data layer comprising a data warehouse that stores values of a plurality of metrics collected by a monitoring device while a plurality of computers are operating, the plurality of metrics comprising processor utilization, memory utilization, storage utilization, and network utilization;

providing an application layer that accesses the plurality of metrics in the data layer, and upon accessing the plurality of metrics in the data layer, triggers exceptions comprising a first exception when a first metric in the plurality of metrics exceeds a first threshold and a second exception when a second metric in the plurality of metrics falls below a second threshold; and providing a presentation layer that provides:

an exception setting interface configured to allow customization of the exceptions by at least one of a plurality of capacity planners, the exception setting interface comprising a threshold column and a time component column, an exception display interface that displays the exceptions and whether the exceptions have been triggered, arranged by application and type of exception, and a report interface that displays changes to the data layer made by at least one of the plurality of capacity planners and to associate each of the changes with a corresponding one of the plurality of capacity planners, that displays a metric identification that specifies a metric of the plurality of metrics that was changed as a result of the changes, that displays a current setting of the metric specified in the metric identification, the current setting comprising a current value of the metric after the changes, the current setting pertaining to a threshold or to a time component, and displays a previous setting of the metric specified in the metric identification, the previous setting comprising a previous value of the metric before the changes, the previous setting pertaining to a threshold or to a time component.

12. The non-transitory computer-readable medium of claim 11, wherein the an exception setting interface enables at least one of the plurality of capacity planners to set a first value of the first threshold and a second value of the second threshold.

13. The non-transitory computer-readable medium of claim 11, wherein the application layer triggers the exceptions based on changes to hardware resources in at least one of the plurality of computers.

14. The non-transitory computer-readable medium of claim 11, wherein the exception display interface further displays whether the exceptions have been triggered, arranged by application, computer.

15. The non-transitory computer-readable medium of claim 11, wherein the exception display interface enables at least one of the plurality of capacity planners to record acknowledgments that at least one of the exceptions have been addressed by at least one of the plurality of capacity planners.

* * * * *